(12) United States Patent
Smith et al.

(10) Patent No.: US 9,169,569 B2
(45) Date of Patent: Oct. 27, 2015

(54) ALTERNATING VOLTAGE ELECTROCHEMICAL REFORMING

(71) Applicant: Phillips 66 Company, Houston, TX (US)

(72) Inventors: Danielle Kristin Smith, Bartlesville, OK (US); Neal Donald McDaniel, Bartlesville, OK (US); Mahaprasad Kar, Bartlesville, OK (US); Dennis Schultz, Bartlesville, OK (US); Bruce B. Randolph, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 146 days.

(21) Appl. No.: 13/940,924

(22) Filed: Jul. 12, 2013

(65) Prior Publication Data
US 2014/0014525 A1  Jan. 16, 2014

Related U.S. Application Data

(60) Provisional application No. 61/671,865, filed on Jul. 16, 2012.

(51) Int. Cl.
*C25B 1/10* (2006.01)
*C25B 15/00* (2006.01)
*C25B 1/02* (2006.01)
*C25B 1/04* (2006.01)

(52) U.S. Cl.
CPC ... *C25B 1/10* (2013.01); *C25B 1/02* (2013.01); *C25B 1/04* (2013.01); *C25B 15/00* (2013.01); *Y02E 60/366* (2013.01)

(58) Field of Classification Search
CPC .................................. C25B 1/02; C25B 1/10
USPC ......................................................... 205/637
See application file for complete search history.

(56) References Cited

U.S. PATENT DOCUMENTS

| 4,341,608 | A | 7/1982 | St. John |
| 4,786,382 | A | 11/1988 | Utley et al. |
| 2005/0051426 | A1 | 3/2005 | Kitada et al. |
| 2008/0190780 | A1 | 8/2008 | Wang |
| 2008/0318097 | A1* | 12/2008 | Botte ................... C25B 1/00 429/524 |
| 2012/0125270 | A1 | 5/2012 | Henry et al. |

FOREIGN PATENT DOCUMENTS

| EP | 2090678 | 8/2009 |
| WO | 2010094113 | 8/2010 |

OTHER PUBLICATIONS

PCT Notification of Transmittal of the International Search Report and the Written Opinion of the International Searching Authority, or the Declaration, International Application No. PCT/US2013/050503, International Filing Date: Jul. 15, 2013, 13 pages.

* cited by examiner

*Primary Examiner* — Nicholas A Smith
(74) *Attorney, Agent, or Firm* — Phillips 66 Company

(57) ABSTRACT

A method is taught of introducing an alternating voltage between a first electrode and a second electrode in a mixture comprising a depolarizing agent. The method then alternates between forming hydrogen gas at the first electrode while simultaneously oxidizing a depolarizing agent at the second electrode and forming hydrogen gas at the second electrode while simultaneously oxidizing the depolarizing agent at the first electrode.

25 Claims, 11 Drawing Sheets

20 wt% GLYCEROL

ALTERNATING VOLTAGE ELECTROCHEMICAL REFORMING

CROSS-REFERENCE TO RELATED APPLICATIONS

This application is a non-provisional application which claims the benefit of and priority to U.S. Provisional Application Ser. No. 61/671,865 filed Jul. 16, 2012, entitled "Alternating Voltage Electrochemical Reforming," which is hereby incorporated by reference in its entirety.

STATEMENT REGARDING FEDERALLY SPONSORED RESEARCH OR DEVELOPMENT

None.

FIELD OF THE INVENTION

This invention relates to electrochemical reforming of a depolarizing agent using alternating voltage.

BACKGROUND OF THE INVENTION

Hydrogen production has become a priority in many refinery operations, especially when trying to produce lower sulfur gasoline and diesel fuels. Along with increased hydrogen consumption for deeper hydrotreating, additional hydrogen is typically needed for processing heavier and higher sulfur crude slates. New safe and reliable sources of hydrogen for refineries and clean fuels are now required to meet the needs of the future transportation fuel market and the drive towards higher refinery profitability.

One method of hydrogen production is electrochemical reforming, also known as anode depolarized electrolysis, using a constant cell voltage. Hydrogen production by electrochemical reforming is conceptually simple: two electrical leads are inserted into a mixture of a depolarizing agent and water, an electric potential is applied between the leads, and two different chemical reactions take place, one at each electrode. At the cathode, water is electrochemically-reduced to form hydrogen gas. At the anode, the depolarizing agent is electrochemically oxidized. By utilizing small voltages, electrochemical reforming avoids the production, of oxygen gas, an inherent product in conventional water electrolysis. Because hydrogen is produced in the absence of oxygen, there is a reduced explosion hazard associated with membraneless operation, relieving the need for gas-separating technology.

One common problem with standard electrochemical reforming is electrode deactivation. Regardless of the various reaction parameters, that can be optimized such as temperature, pH, voltage, or the electrochemical reforming medium, the rate of the overall electrochemical reforming process deteriorates rapidly following the initiation of the process. Over a matter of minutes the deactivation of the electrodes will significantly diminish the reaction kinetics, and for some depolarizing agents the reaction will die completely.

BRIEF SUMMARY OF THE DISCLOSURE

A method is taught of introducing an alternating voltage between a first electrode and a second electrode in a mixture comprising a depolarizing agent. The method then alternates between forming hydrogen gas at the first electrode while simultaneously oxidizing a depolarizing agent at the second electrode and forming hydrogen gas at the second electrode while simultaneously oxidizing the depolarizing agent at the first electrode.

In an alternate embodiment a method is taught of introducing an alternating voltage, with magnitude ranging from 0.01 volts to 5.0 volts per cell, to a first electrode and a second electrode in a mixture, ranging from 0° C. to 300° C., consisting essentially of a depolarizing agent. The method then alternates between forming hydrogen gas and reactivating at the first electrode while simultaneously oxidizing the depolarizing agent at the second electrode and forming hydrogen gas and reactivating at the second electrode while simultaneously oxidizing the depolarizing agent at the first electrode.

In another embodiment the method describes flowing a mixture comprising a depolarizing agent over a first electrode and a second electrode. An alternating voltage is then introduced between a first electrode and a second electrode in the mixture. The method then alternates between forming hydrogen gas at the first electrode while simultaneously oxidizing a depolarizing agent at the second electrode and forming hydrogen gas at the second electrode while simultaneously oxidizing the depolarizing agent at the first electrode.

In yet another embodiment the method describes flowing a mixture, ranging from 0° C. to 300° C., comprising a depolarizing agent over a first electrode and a second electrode. An alternating voltage is introduced with magnitude ranging from 0.01 volts to 5.0 volts to a first electrode and a second electrode in the liquid mixture. The method then alternates between forming hydrogen gas and reactivating at the first electrode while simultaneously oxidizing the depolarizing agent at the second electrode and forming hydrogen gas and reactivating at the second electrode while simultaneously oxidizing the depolarizing agent at the first electrode.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
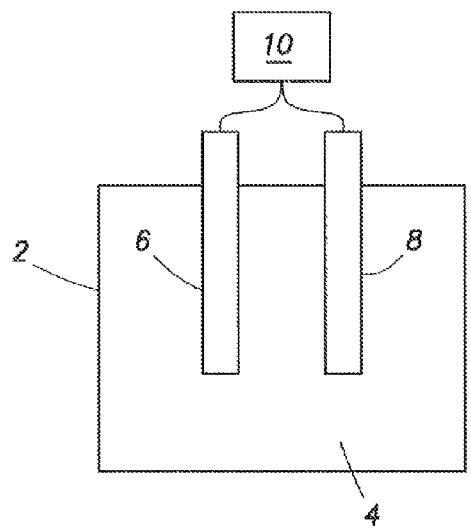
FIG. 1 depicts the method as a batch reaction.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In one embodiment, the features describe a method of introducing an alternating voltage between a first electrode and a second electrode in a mixture comprising a depolarizing agent. The method then alternates between forming hydrogen gas at the first electrode while simultaneously oxidizing a depolarizing agent at the second electrode and forming hydrogen gas at the second electrode while simultaneously oxidizing a depolarizing agent at the first electrode.

In one embodiment the first electrode and the second electrode are made from the same material. In this embodiment both the first electrode and the second electrode should be capable of catalyzing both reactions relevant to electrochemical reforming, hydrogen production and oxidization of the depolarizing agent. Examples of metals that can be used as electrodes include: stainless steel, nickel, platinum, palladium, gold, carbon (graphitic, nanotubes, buekeyballs, and other conductive forms), Monel®, Inconel®, and Invar® alloys.

Both the first electrode and the second electrode can be placed in the mixture comprising a depolarizing agent. In one embodiment both the first electrode and the second electrode can be placed in a single compartment to minimize electrical resistance through the device and simplify cell design. This single compartment reaction is one differentiator of this embodiment from standard electrolysis which-must be conducted in a compartmentalized fashion with an ion-conduction membrane, salt bridge, frit, or other gas-separating technology.

The mixture in which the electrodes are placed contains at least a depolarizing agent and a source of protons. Typically, although not required, the mixture is an aqueous or otherwise protic solvent mixture.

Depolarizing agents used for this reaction can be any chemical that is oxidized more easily than water, including compounds containing oxygen, nitrogen, sulfur, or phosphorus as part of the chemical structure. More specifically, the depolarizing agents can be amines, thiols, phosphines, mixed and unmixed heterocycles, alcohols, sugar alcohols, aldehydes, ketones, carboxylic acids, ethers, esters, phenols, anhydrides, or saccharides (monomer and polymer). Other depolarizing agents that can be used include organic and inorganic compounds that can be readily oxidized, and are dispersible in the employed solvent. The depolarizing agent can be derived from biomass, fossil fuel, or related process streams. The weight percent of depolarizing agents in the mixture can be greater than 0.01%, 1%, 5%, 10%, 20%, 50%, 80%, even up to 100%. The weight percent can be lower than 0.01% as well within the means of practicality.

In other embodiments additional chemicals can either be added or not added to the mixture. Although the addition of additional chemicals may add to the cost of the reaction it can greatly Increase the reaction kinetics. Chemicals such as both solid and liquid electrolytes; solvents; solute; dispersions; catalysts; catalyst activating agents; surfactants; conductive solid particles and other chemicals can be added to the mixture. Alternatively, it is possible that no additional chemicals are added to the mixture. When compared to other types of reactions, the cost of the reaction can be lower due to the omission of adding any oxidizing or reducing agents, or any non-polar or inert compounds.

In one embodiment the temperature of the mixture during the reaction ranges from −20° C. to 400° C. The temperature of the mixture during the reaction can also range from 0° C. to 350° C. or even 0° C. to 300° C.

The voltage applied to the electrodes can be an alternating voltage. An alternating voltage is one where the electric field vector periodically changes direction. It is not a requirement for the alternating voltage to be perfectly symmetric, but advantages are observed when the cell voltage is allowed to switch signs periodically, such that each electrode spends some amount of time both as an anode and as a cathode.

In FIG. 1 the method is shown as a batch reaction. In this figure a single compartment 2, contains a mixture 4, containing a depolarizing agent, a first electrode 6, and a second electrode 8. An alternating voltage from a power source 10 is applied between the first electrode 6 and the second electrode 8, at which time the electrode which is acting as a cathode converts protons from water, from the depolarizing agent, or from the electrolyte into hydrogen gas. Simultaneously, at the electrode which is acting as an anode, the depolarizing agent is being converted to oxidized products. The intermittent inverting of current due to the alternating voltage is theorized to remove electrode deactivation that typically plagues direct voltage electrochemical reforming.

In one embodiment the amplitude or magnitude of the alternating cell voltage (for one cathode-anode pair) can range from ±0.01 to ±5 volts, for example a stack of 5 cells could therefore be powered by ±0.05 to ±25 volts. The amplitude of the alternating cell (one cathode-anode pair) voltage could range from ±0.01 to ±2.3V; most preferably from ±0.01 to ±1.23V. In addition, it is also feasible that the alternating voltage waveform is a non-sinusoidal waveform, for example a square wave. A square wave is generally defined as a waveform that alternates regularly by a step-function between two values. When multiple cells (one cathode-anode pair) are placed in series, the total amplitude of the alternating voltage could exceed ±5 V, but the applied alternating voltage per cell does not. There is no limit to the number of cells that can be stacked in a series circuit. The amplitude of the alternating voltage applied to a stack of cells depends linearly on the number of cells in the stack.

There is no limit to the frequency of the alternating voltage that can be used in this method. In one embodiment the frequency of the voltage used can be as low as 0.05 Hz. In other embodiments the frequency used can be 60 Hz, 120 Hz, 240 Hz or higher, without reaching a point of diminishing hydrogen yield. The frequency range can be from 0.1 to 60 Hz.

In another embodiment it is possible that 0 wt % of the gases produced from the reaction is oxygen.

Figure 2:
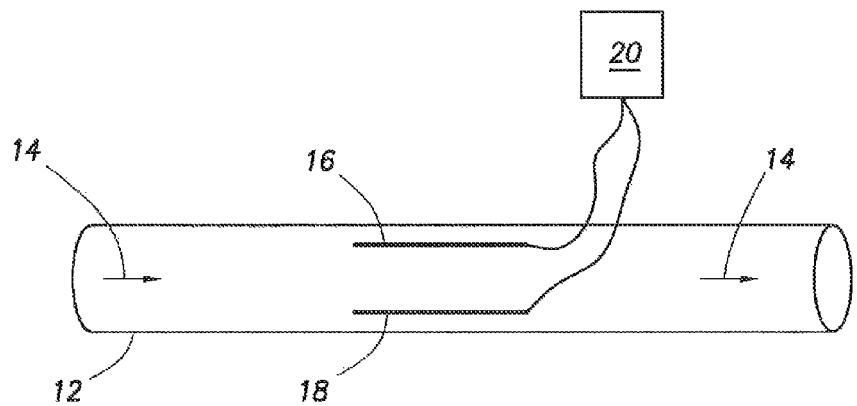
FIG. 2 depicts the method as a continuous reaction.
Figure 3:
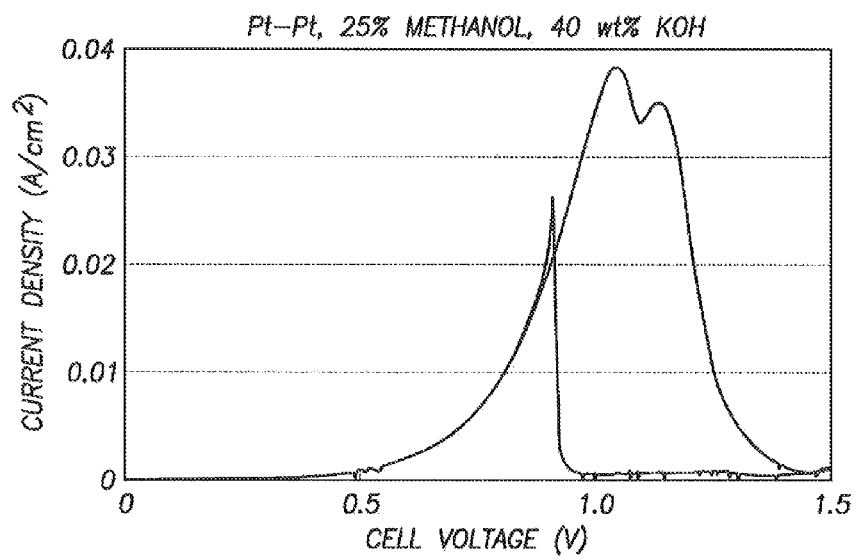
FIG. 3 depicts a current density versus applied direct voltage graph.
Figure 4:
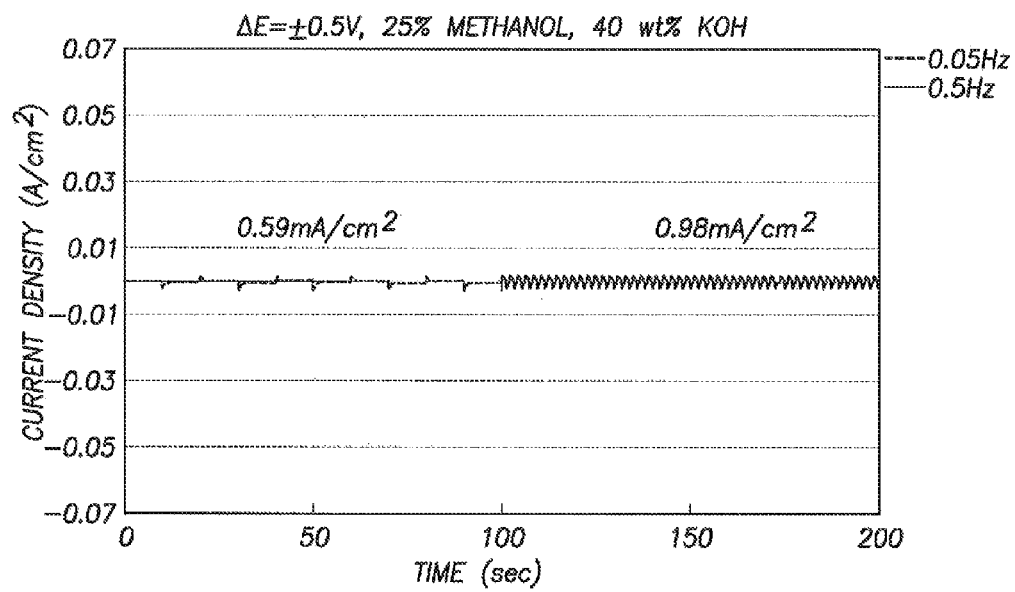
FIG. 4 depicts a current density versus time graph resulting from an alternating voltage signal.

A batch reaction is not the only way this method can be utilized. As shown in FIG. 2, the method is shown as a continuous reaction. In this Figure a pipeline 12 is shown. A mixture 14 containing a depolarizing agent flows through the pipeline 12. A first electrode 16 and a second electrode 18 are shown to be placed into the pipeline. The placement of the electrodes are not required to be in a parallel configuration, but merely described in this figure as such. In other embodiments the first electrode 16 and the second electrode 18 can be coaxial, interdigitated, rolled into a spiral, or placed at any angle as long as they are in contact with the mixture 14 in the pipeline 12.

In both FIG. 1 and FIG. 2 the first electrode and the second electrode are shown to be two separate electrodes. In some embodiments with certain metal alloys and barriers it is possible to have a single electrode that simultaneously functions as the first electrode and the second electrode at the same time.

In one embodiment while one of the electrodes is being anodized, the other is simultaneously being deactivated as it evolves hydrogen gas. Fouling typically occurs throughout time during electrochemical reforming. By performing the method of alternating voltage electrochemical reforming the electrode that is evolving hydrogen can be simultaneously deactivated.

The following examples of certain embodiments of the invention are given. Each example is provided by way of explanation of the invention, one of many embodiments of the invention, and the following examples should not be read to limit, or define, the scope of the invention. Examples 1 through 5 were carried out in an open glass reactor (ambient pressure) while Example 6 was carried out in a closed batch reactor at elevated temperatures and pressures. Although in this example hydrogen was produced at elevated pressures with the batch reactor to avoid compression and electricity costs this effect can also be achieved with a continuous reactor. In one embodiment the elevated pressures in a vessel such as a pressurized vessel can range from 1 psig to 1000 psig or even 100 to 500 psig.

EXAMPLE 1

A mixed alcohol stream is nominally 60% methanol. To simulate electrochemical reforming of such a stream methanol was mixed with an electrolyte of 40 wt % potassium hydroxide to form a mixture. The balance of the solution was water. Both the first electrode and the second electrode were 1 $cm^2$ platinum foil, and the electrochemical reforming was conducted at 40° C. The volumetric content of the methanol in the solution was 25%. A cyclic voltammogram as well as potential square waves of varying amplitude are shown in FIG. 3 through FIG. 6. The potential square-waves exhibit very little decay in current density with increasing time, demonstrating the benefit of using alternating voltage. As shown in the figures, changing the frequency of the square wave from 0.05 to 0.5 Hz demonstrates that faster frequencies results in greater average current densities.

EXAMPLE 2

Figure 5:
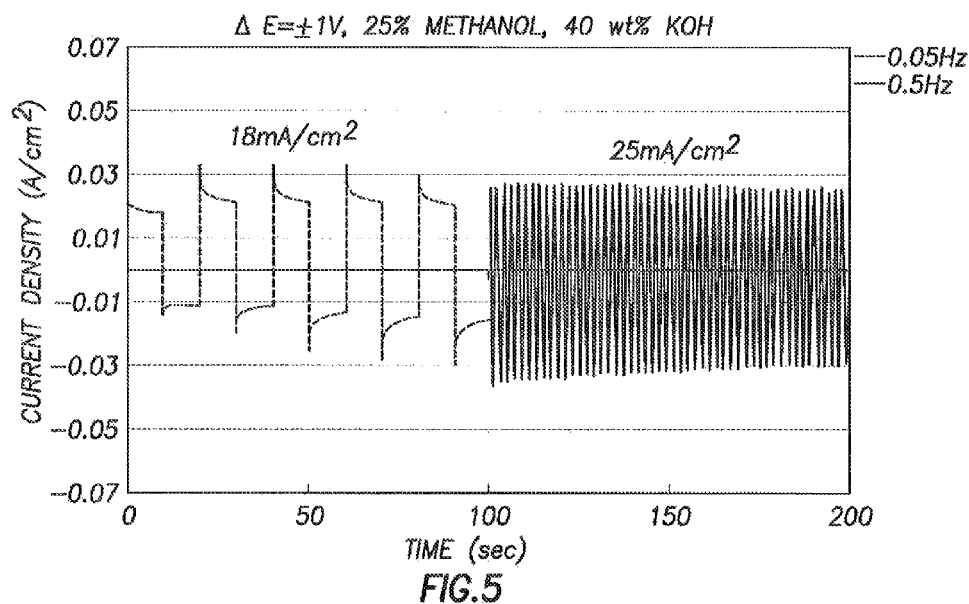
FIG. 5 depicts a current density versus time graph resulting from an alternating voltage signal.
Figure 6:
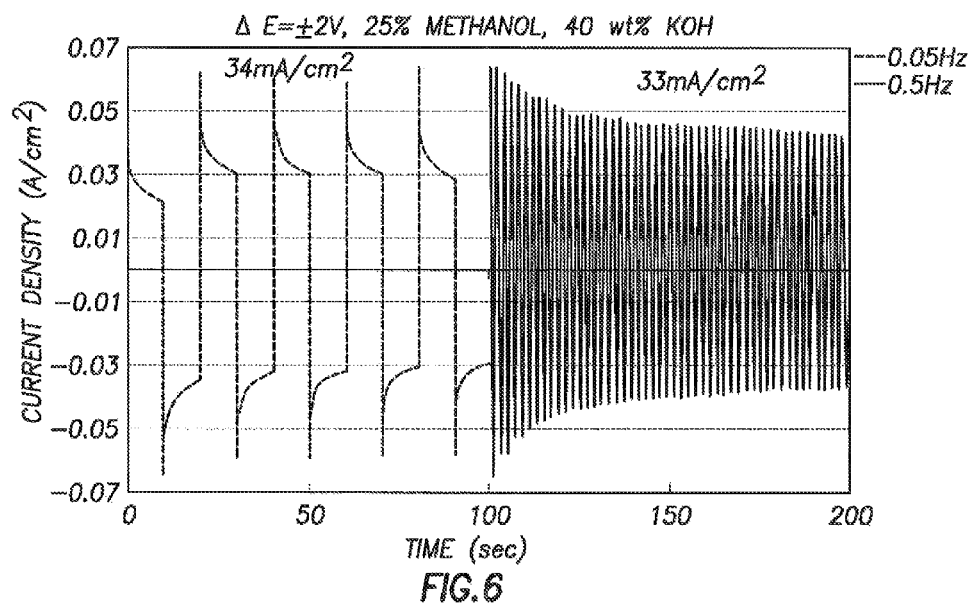
FIG. 6 depicts a current density versus time graph resulting from an alternating voltage signal.
Figure 7:
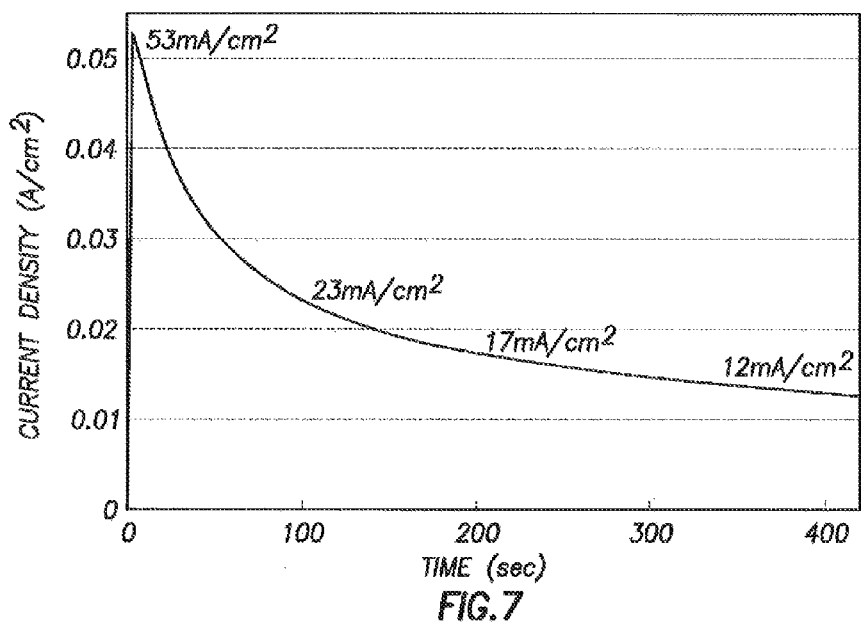
FIG. 7 depicts a current versus time graph resulting from a direct voltage signal.

In this example a 25% methanol solution was mixed with an electrolyte of 40 wt % potassium hydroxide to form a mixture. The balance of the solution was water. Both the first electrode and the second electrode were 1 $cm^2$ platinum foil, and the electrochemical reforming was conducted at 40° C. FIGS. 7 and 5 demonstrate a comparison between a cell voltage square-wave of magnitude 1 volt with a potentiostatic measurement taken at a cell voltage of 1 volt for 7 minutes. As shown in these figures there is much less decay in the current density when electrochemical reforming is operated with alternating voltage. Specifically, in FIGS. 7 and 5, at 200 seconds, the method reveals an average current density of 25 mA whereas the potentiostatic measurement is only 17 mA, The substantial decay that is typically observed during a potentiostatic measurement is completely avoided when alternating voltage is used, as the potential square-wave displays a stable current even with increasing time.

EXAMPLE 3

Figure 8:
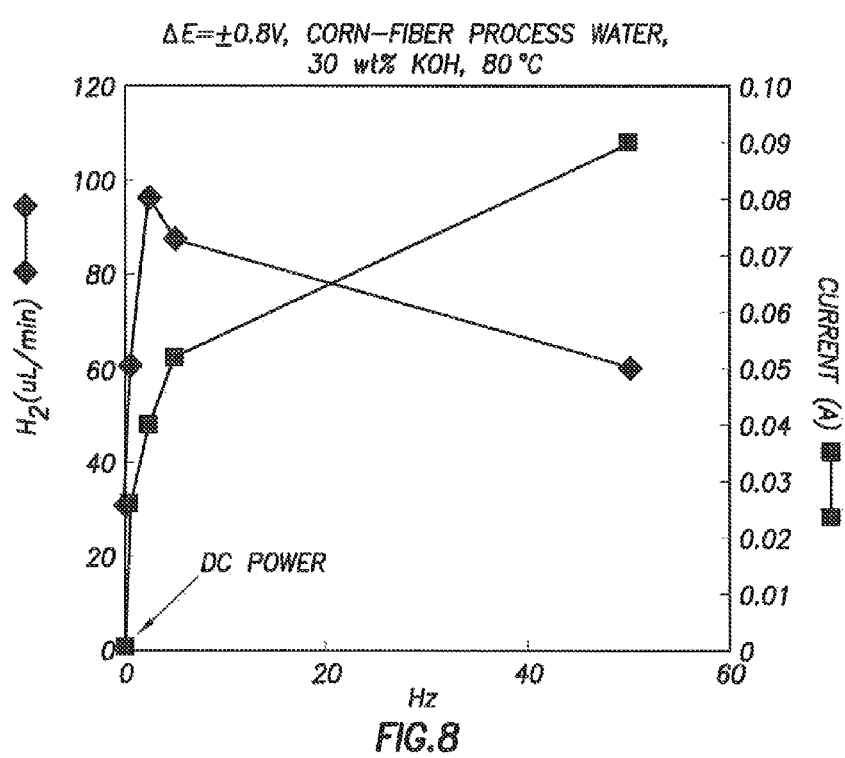
FIG. 8 depicts a graph demonstrating the relationship between generated hydrogen, operating frequency of the alternating voltage, and resulting current from a corn fiber oligomer solution, a waste eluent of a corn fiber upgrading process.
Figure 9:
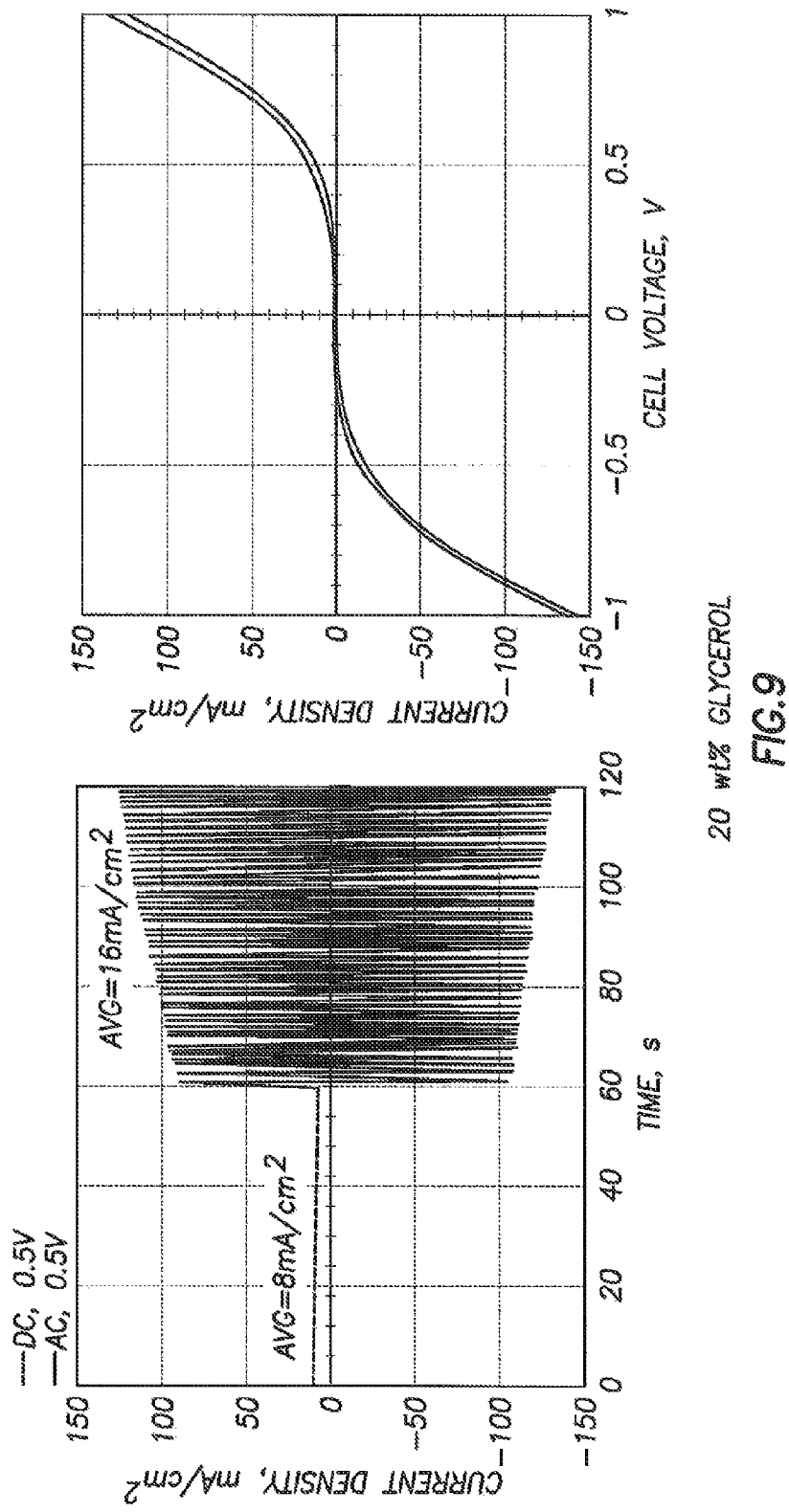
FIG. 9 depicts current versus time and current versus voltage for 20 wt % glycerol solution, and compares the direct and alternating voltage modes.
Figure 10:
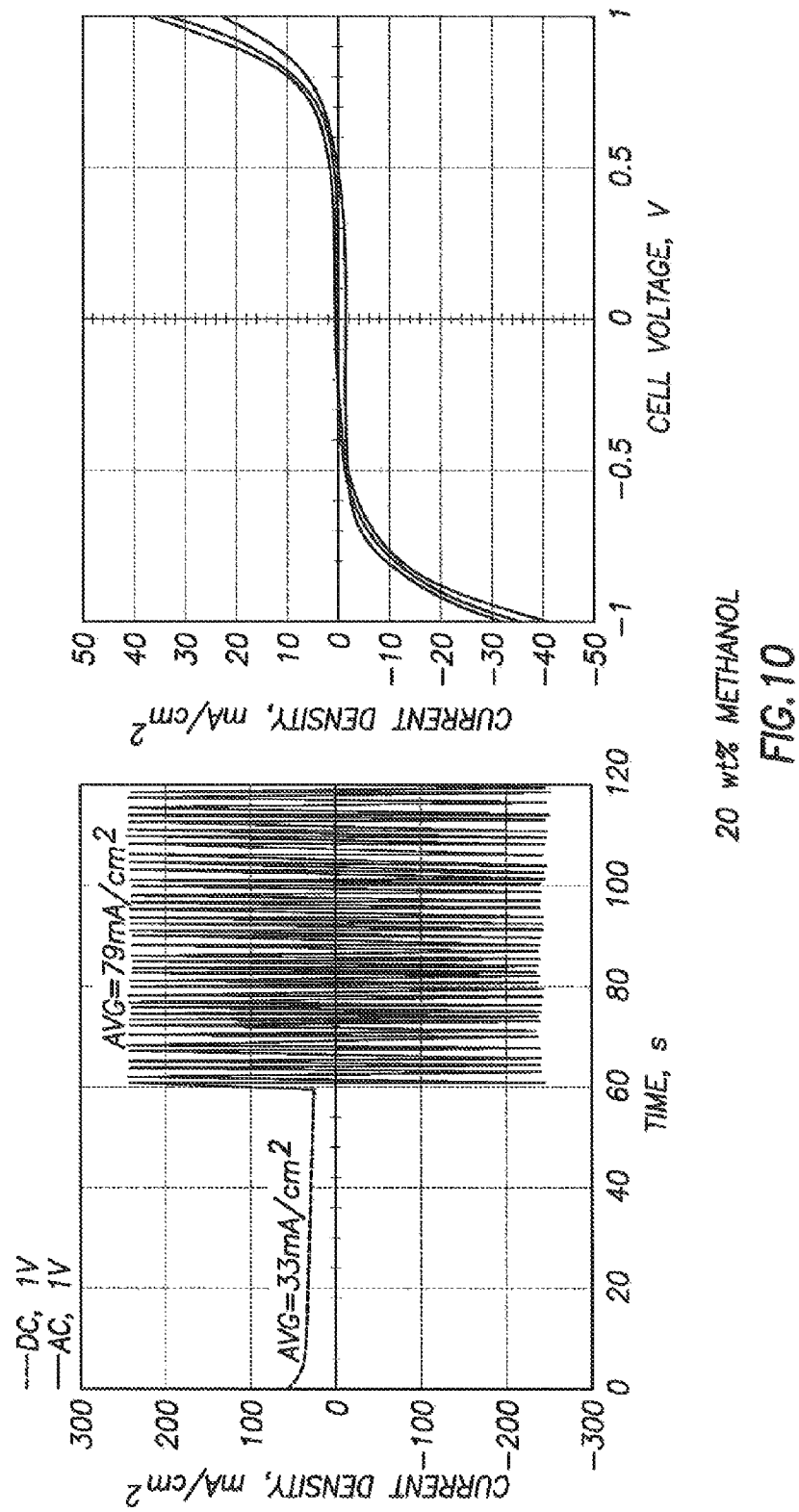
FIG. 10 depicts current versus time and current versus voltage for 20 wt % methanol solution, and compares the direct and alternating voltage modes.
Figure 11:
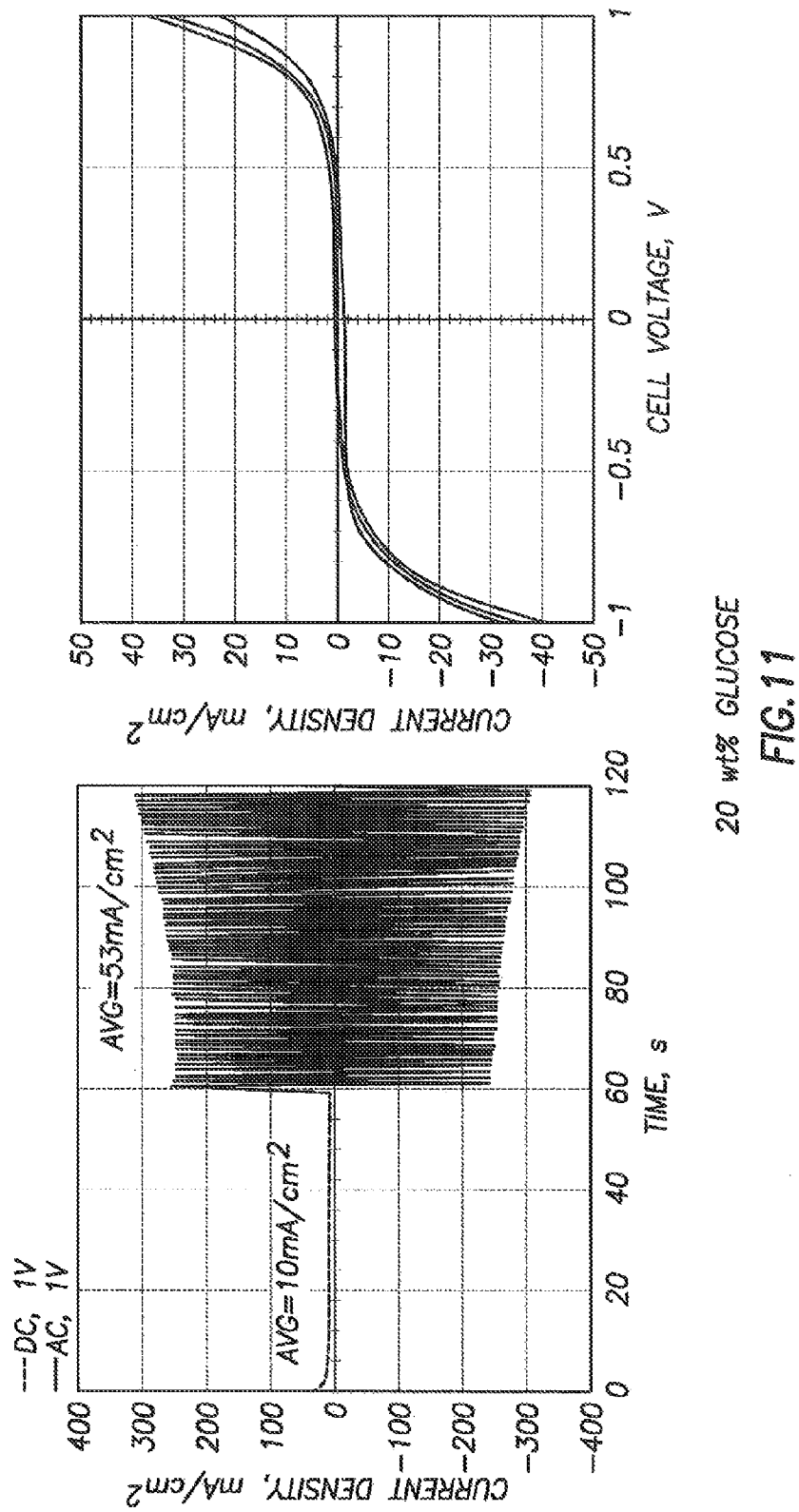
FIG. 11 depicts current versus time and current versus voltage for 20 wt % glucose solution, and compares the direct and alternating voltage modes.
Figure 12:
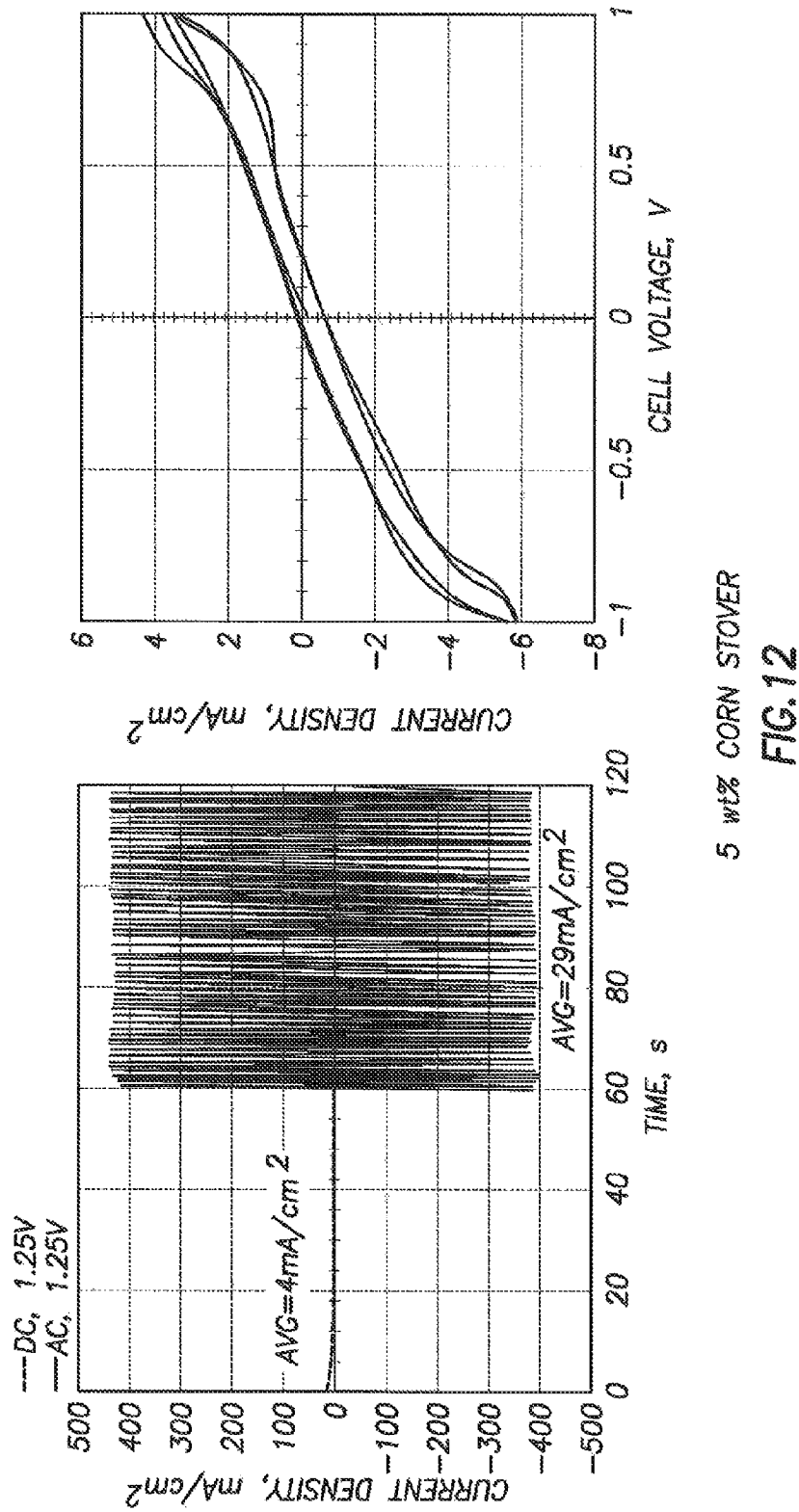
FIG. 12 depicts current versus time and current versus voltage for 5 wt % corn stover oligomer solution, and compares the direct and alternating voltage modes.

In this example an aqueous stream from a corn fiber hydrolysis process was utilized as the depolarizing agent and mixed with aqueous 30 wt % potassium hydroxide. Both the first electrode and the second electrode were 1 $cm^2$ platinum foil, and the electrochemical reforming was conducted at 80° C. As shown in FIG. 8, both direct voltage electrochemical reforming and alternating voltage electrochemical reforming was done on this mixture. An alternating cell voltage of ±0.8 V was applied for a duration in excess of 10 minutes. In this example measurements of the hydrogen production and current were taken at 0.5, 2.5, 5, and 50 Hz.

EXAMPLE 4

In this example five different mixtures were made with identical electrolyte concentrations. Both the first electrode and the second electrode were 1 $cm^2$ platinum-gold alloy supported by 316 stainless steel, and the electrochemical reforming was conducted at 80° C. They were first electrolyzed for 60 seconds with a static cell voltage of the given value, then with alternating voltage of identical magnitude. Current from capacitance charging and other side processes was corrected by performing control experiments without any depolarizing agent present. These results are summarized in Table 1. In all cases, alternating voltages produced a factor of 2, up to a factor of 7 times more hydrogen than stationary voltage, when averaged over 60 seconds. That ratio continues to increase as the duration of the experiment is extended further. FIGS. 9, 10, 11, 12 depict a comparison of current density versus time and current density versus cell voltage for each of these mixtures.

TABLE 1

| Solution Contents | Cell Voltage (Volts) | Without Baseline Correction | | With Baseline Correction | |
|---|---|---|---|---|---|
| | | $J_{DC}$, mA/$cm^2$ | $J_{AC}$, mA/$cm^2$ | $J_{DC}$, mA/$cm^2$ | $J_{AC}$, mA/$cm^2$ |
| 50 wt % Water, 30 wt % KOH, 20 wt % Glycerol | 0.5 | 8 | 20 | 8 | 16 |

TABLE 1-continued

| | Cell Voltage (Volts) | Without Baseline Correction | | With Baseline Correction | |
|---|---|---|---|---|---|
| Solution Contents | | $J_{DC}$, mA/cm$^2$ | $J_{AC}$, mA/cm$^2$ | $J_{DC}$, mA/cm$^2$ | $J_{AC}$, mA/cm$^2$ |
| 50 wt % Water, 30 wt % KOH, 20 wt % Methanol | 1.0 | 35 | 94 | 33 | 79 |
| 50 wt % Water, 30 wt % KOH, 20 wt % Glucose | 1.0 | 12 | 68 | 10 | 53 |
| 65 wt % Water, 30 wt % KOH, 5 wt % Corn Stover Oligomer | 1.25 | 7 | 57 | 4 | 29 |
| 70 wt % Water, 30 wt % KOH (no depolarizing agents) | 0.5 | 0.1 | 4 | 0 | 0 |
| 70 wt % Water, 30 wt % KOH (no depolarizing agent) | 1.0 | 2 | 15 | 0 | 0 |
| 70 wt % Water, 30 wt % KOH (no depolarizing agents) | 1.25 | 3 | 28 | 0 | 0 |

EXAMPLE 5

In this example, ion-chromatography for weak acids analysis was performed on depolarizing agents methanol, mixed light alcohols, and ethanol after alternating voltage electrochemical reforming. The depolarizing agents were mixed with aqueous 30 wt % potassium hydroxide, and the electrochemical reforming took place at 40° C. using an applied cell voltage of +/−1.1 Volts with a frequency of 2.5 Hz. Both the first electrode and the second electrode were 1 cm$^2$ platinum foil. As shown in the Tables 2, 3, 4 and 5, higher amounts of formate, acetate, and other carboxylates were observed after performing alternating voltage electrochemical reforming on methanol, mixed light alcohols, ethanol and corn-fiber water.

TABLE 2

| Sample Name | 40 wt % Methanol, Pre-test | 40 wt % Methanol, Post-test |
|---|---|---|
| Acetate | 32 | 33 |
| Borate | <1 | <1 |
| Butyrate | <1 | <1 |
| Caproate | <1 | <1 |
| Fluoride | <1 | 1 |
| Formate | 7 | 5,688 |
| Glutarate | <1 | <1 |
| Glycolate | 1 | <1 |
| Propionate | <1 | 2 |
| Sulfide | <1 | <1 |
| Valerate | <1 | <1 |

TABLE 3

| Sample Name | 40 wt % Mixed Light Alcohols pre-test | 40 wt % Mixed Light Alcohols post-test |
|---|---|---|
| Acetate | 74 | 229 |
| Borate | <1 | <1 |
| Butyrate | <1 | <1 |
| Caproate | <1 | <1 |
| Fluoride | <1 | 1 |
| Formate | 30 | 3,101 |
| Fumarate | <1 | 2 |
| Glutarate | <1 | <1 |
| Glycolate | 24 | 139 |
| Propionate | 4 | 8 |

TABLE 3-continued

| Sample Name | 40 wt % Mixed Light Alcohols pre-test | 40 wt % Mixed Light Alcohols post-test |
|---|---|---|
| Sulfide | 3 | <1 |
| Valerate | <1 | <1 |

TABLE 4

| Product Ion | Ethanol ECR |
|---|---|
| Fluoride | <1 |
| Fumarate | 19 |
| Glycolate | 2 |
| Succinate | 8 |
| Borate | 19 |
| Formate | <1 |
| Glutarate | <1 |
| Acetate | 1,879 |
| Propionate | 1 |
| Butyrate | <1 |
| Sulfide | <1 |
| Valerate | <1 |
| Caproate | <1 |

TABLE 5

| Sample Name | Corn-fiber oligomer, Pre-test | Corn-fiber oligomer, Post-test |
|---|---|---|
| Acetate | 1,061 | 1,185 |
| Borate | <1 | <1 |
| Butyrate | 389 | 319 |
| Caproate | <1 | 103 |
| Fluoride | 3 | 32 |
| Formate | 254 | 1,085 |
| Glutarate | <1 | 18 |
| Glycolate | <1 | <1 |
| Propionate | 633 | 2,687 |
| Sulfide | 617 | 722 |
| Valerate | <1 | <1 |

The production of formate and acetate from alcohols is clear evidence that the depolarizing agents are being oxidized.

EXAMPLE 6

The liquid products from a hydrogen-producing reaction initially containing 20 wt % glycerol, 30 wt % potassium hydroxide, and 50 wt % water were analyzed by ion chromatography for weak acids. The reaction was carried out at 165° C. for 28 hours inside a pressurized (250 psi), insulated Hastelloy reactor, with an alternating cell voltage of ±0.75 V at a frequency of 0.1 Hz. Headspace gas analysis by mass spectrometry revealed only hydrogen production. Analysis of the liquids showed evidence for formate and glycolate ions in high concentration, as shown in Table 6. This evidence suggests oxidation of glycerol to the point of breaking carbon-carbon bonds during this reaction.

TABLE 6

| Weak Acids | Peak Area |
| --- | --- |
| Fluoride | 2 |
| Glycolate | 11,967 |
| Succinate | <1 |
| Borate | <1 |
| Formate | 676 |
| Glutarate | 40 |
| Acetate | 47 |
| Propionate | 2 |
| Butyrate | <1 |
| Sulfide | <1 |
| Valerate | <1 |
| Caproate | <1 |

EXAMPLE 7

Figure 13:
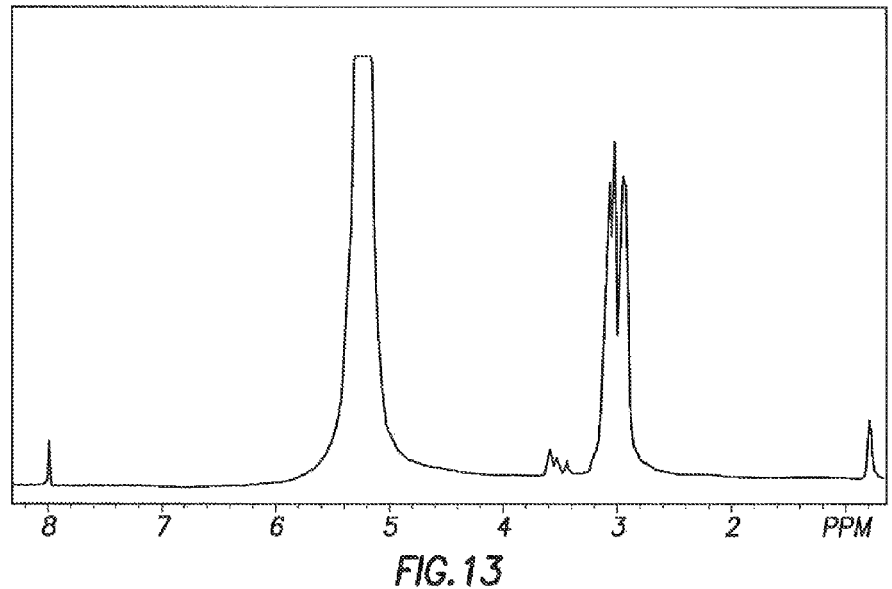
FIG. 13 depicts a NMR after performing alternating voltage electrochemical reforming on glycerol.

A 300 Mhz NMR spectrum was recorded for the depolarizing agent glycerol after alternating voltage electrochemical reforming in concentrated potassium deuteroxide, 80° C., at a cell voltage of ±0.5 V. As shown in FIG. 13 a clear peak can be seen at around 8 ppm, indicative of aldehyde formation, the first expected oxidation product of glycerol.

EXAMPLE 8

Figure 15:
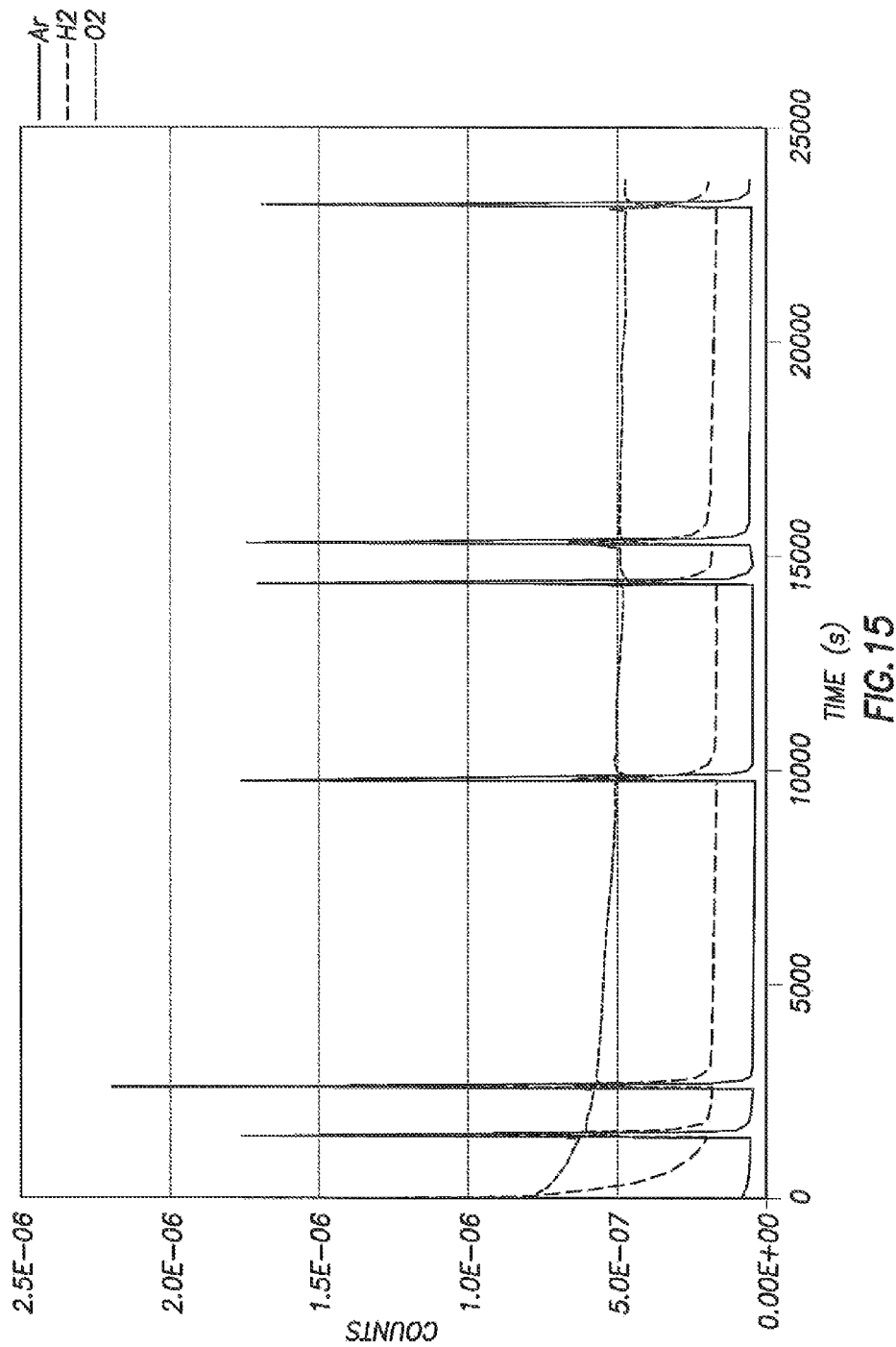
FIG. 15 depicts a mass spectrogram of the headspace of a batch reaction on an alternating voltage electrochemical reforming on methanol with argon purge.

Gaseous samples were taken from the headspace of a ±0.5 volt alternating voltage electrochemical reforming reaction. In this reaction the reactor contents were 20 wt % methanol, 50 wt % water, and 30 wt % potassium hydroxide electrolyte. The mass spectrometer was purged with argon and the headspace gas samples were injected into a mass spectrometer for analysis. The results of the analysis are shown in FIG. 15. The following masses were detected:

2—Hydrogen ($^{1}H_2$)

28—Common Isotope of Nitrogen or Carbon Monoxide ($^{12}C^{16}O$ or $^{14}N^{14}N$)

29—Infrequent Isotope of Nitrogen or Carbon Monoxide ($^{13}C^{16}O$ or $^{15}N^{14}N$)

Figure 14:
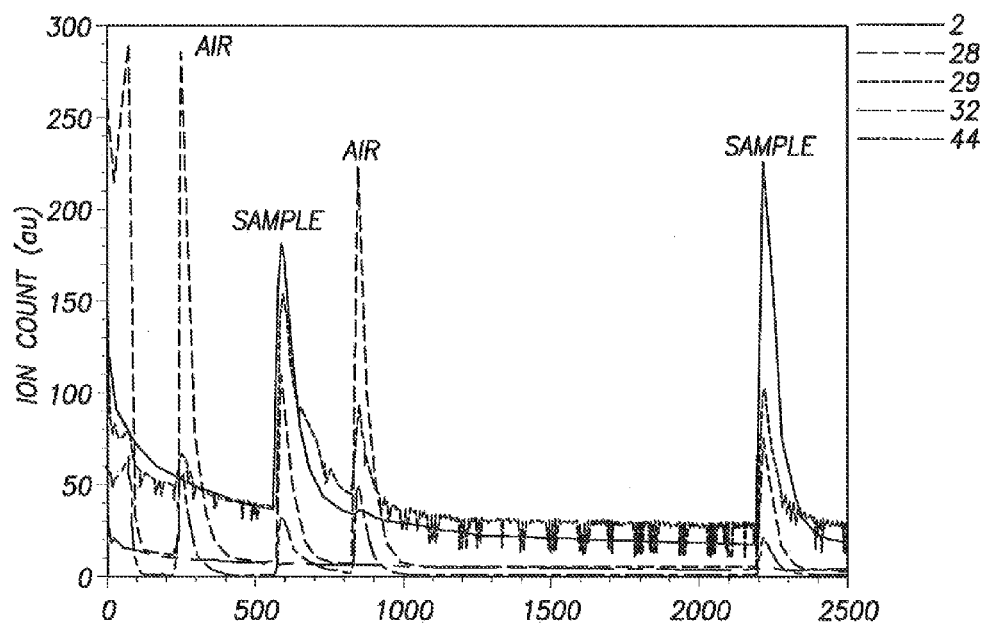
FIG. 14 depicts a mass spectrogram of the headspace of a batch reaction on an alternating voltage electrochemical reforming on methanol with air purge.

As shown in FIG. 14 and Table 5, when air is injected into the mass spectrometer, the ratio of mass 29 to 28 is roughly 1/10, but when the reaction headspace is injected, the ratio rises to 1/1. It should be noted that the values in Table 7 are in arbitrary units that correspond to ion count. The ratios of one mass to another are internally comparable, but should not be taken as an indication of the physical ratio between the mass 28 and 29 gases, as the sensitivity to mass 29 is digitally enhanced over that of 28.

TABLE 7

| | Mass | | |
| --- | --- | --- | --- |
| Injection | 2 | 28 | 29 |
| Air (1) | 2 | 280 | 15 |
| Air (2) | 2 | 220 | 40 |
| Methanol ECR 0.5 V (1) | 150 | 100 | 110 |
| Methanol ECR 0.5 V (2) | 200 | 70 | 70 |

It is theorized that as an impurity, nitrogen from air therefore can not account for the observed abundance of mass 29 in the sample injections, given the relative scarcity of mass 28. Instead, it is more likely that the abundance of mass 29 is explained by the formation of carbon monoxide. The isotopic abundance of carbon 13 is significantly larger than that of nitrogen 15, thus the ratio of mass 29 to 28 should be significantly larger for carbon monoxide than for nitrogen, allowing the distinction between the two gases by mass spectrometry. This evidence strongly suggests the presence of carbon monoxide in the gas above the oxidized methanol solution.

EXAMPLE 9

Figure 16:
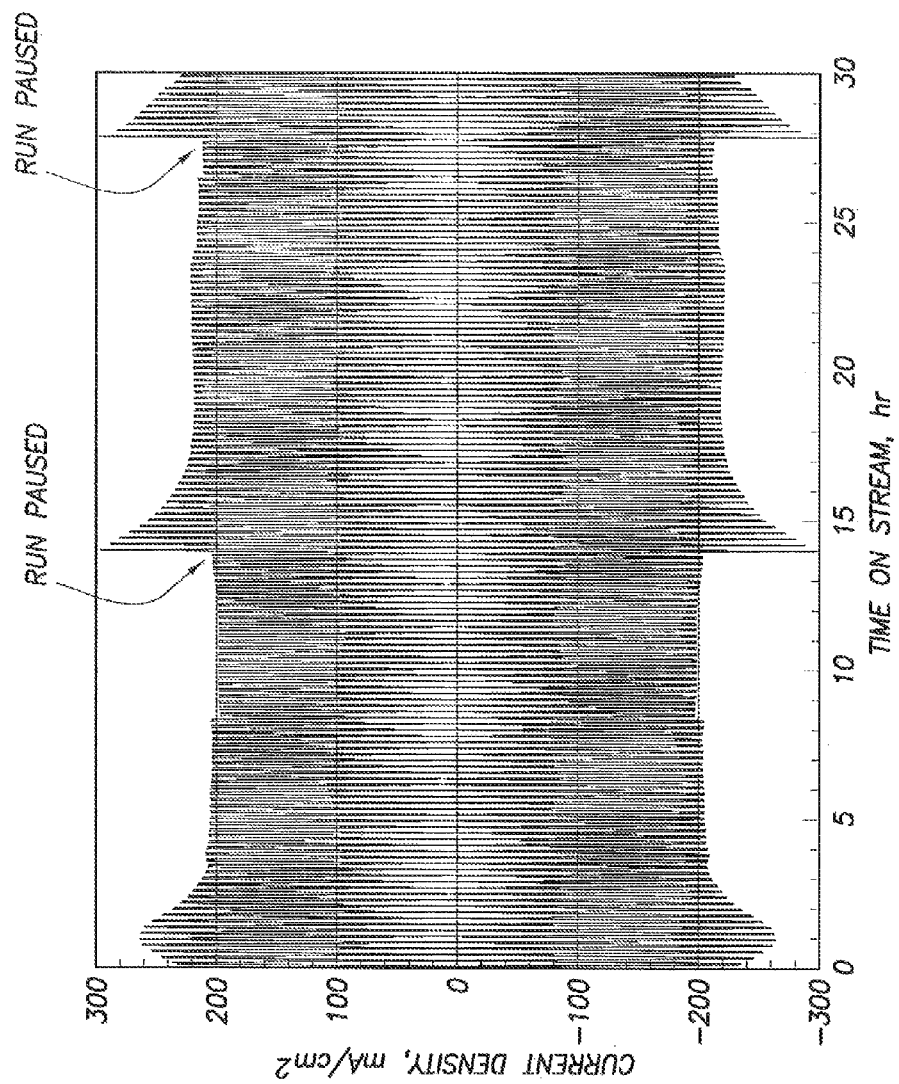
FIG. 16 depicts current versus time for 20 wt % crude glycerol solution passing through a continuous reactor, with 0.5 $V_{AC}$ applied between the 1 cm$^2$ electrodes.

In another example, two 1 $cm^2$ electrodes containing gold and platinum catalyst were mounted inside a temperature-controlled tube, through which flowed a solution containing 20 wt % crude glycerol byproduct from the transesterification of biodiesel, 30 wt % potassium hydroxide, and 50 wt % water. An alternating bias of 0.5 $V_{AC}$ was applied between the two electrodes at a temperature of 140° C., yielding hydrogen at a current density in the range of 200 $mA/cm^2$ (750 $ft^3/d\,m^2$), as shown in FIG. 16. The reaction was paused once every 14 hours to collect voltammograms and restart the measurement.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
   introducing an alternating voltage between a first electrode and a second electrode in a mixture comprising a depolarizing agent; and
   alternating between forming hydrogen gas at the first electrode while simultaneously oxidizing a depolarizing agent at the second electrode and forming hydrogen gas at the second electrode while simultaneously oxidizing the depolarizing agent at the first electrode;

wherein the magnitude of alternating voltage ranges from 0.01 volts to 5 volts and wherein the first electrode and the second electrode occur in two separated compartments.

2. The method of claim 1, wherein the mixture is a liquid mixture.

3. The method of claim 1, wherein the temperature of the mixture ranges from 0° C. to 300° C.

4. The method of claim 1, wherein oxygen is not formed at either the first electrode or the second electrode.

5. The method of claim 1, wherein reactivating occurs while generating hydrogen at either the first electrode or the second electrode.

6. The method of claim 1, wherein the mixture is protic.

7. The method of claim 1, wherein the mixture comprises at least 0.01 wt % of the depolarizing agent.

8. The method of claim 1, wherein the mixture comprises at least 0.1 wt % of an electrolyte.

9. The method of claim 1, wherein the reaction at the first electrode and the second electrode occur in a single compartment.

10. The method of claim 1, wherein the first electrode and the second electrode are both capable of the anodic and cathodic reaction.

11. The method of claim 1, wherein the reaction at the first electrode and the second electrode occur inside a pressurized vessel.

12. The method of claim 1, wherein the alternating voltage is symmetric.

13. A method comprising:
   introducing an alternating voltage, with magnitude ranging from 0.01 volts to 5.0 volts, to a first electrode and a second electrode in a liquid mixture, ranging from 0° C. to 300° C., consisting essentially of a depolarizing agent; and
   alternating between forming hydrogen gas at the first electrode while simultaneously oxidizing the depolarizing agent at the second electrode and forming hydrogen gas at the second electrode while simultaneously oxidizing the depolarizing agent at the first electrode; wherein the first electrode and the second electrode occur in two separated compartments.

14. A method comprising:
   flowing a mixture comprising a depolarizing agent over a first electrode and a second electrode;
   introducing an alternating voltage between a first electrode and a second electrode in the mixture; and
   alternating between forming hydrogen gas and defouling at the first electrode while simultaneously oxidizing the depolarizing agent at the second electrode and forming hydrogen gas and reactivating at the second electrode while simultaneously oxidizing the depolarizing agent at the first electrode;
   wherein the magnitude of alternating voltage ranges from 0.01 volts to 5 volts and wherein the first electrode and the second electrode occur in two separated compartments.

15. The method of claim 14, wherein the alternating voltage magnitude ranges from 0.01 volts to 5.0 volts.

16. The method of claim 14, wherein the mixture is a liquid mixture.

17. The method of claim 14, wherein the mixture ranges from 0° C. to 300° C.

18. The method of claim 14, wherein oxygen is not formed at either the first electrode or the second electrode.

19. The method of claim 14, wherein reactivating occurs while generating hydrogen at either the first electrode or the second electrode.

20. The method of claim 14, wherein the mixture is protic.

21. The method of claim 14, wherein the mixture comprises at least 0.01 wt % of the depolarizing agent.

22. The method of claim 14, wherein the mixture comprises at least 0.1 wt % of an electrolyte.

23. The method of claim 14, wherein the alternating voltage is symmetric.

24. The method of claim 14, wherein the reaction at the first electrode and the second electrode occur inside a pressurized vessel.

25. A method comprising:
   flowing a mixture, ranging from 0° C. to 300° C., comprising a depolarizing agent over a first electrode and a second electrode;
   introducing an alternating voltage, with magnitude ranging from 0.01 volts to 5.0 volts, to a first electrode and a second electrode in the mixture; and
   alternating between forming hydrogen gas and reactivating at the first electrode while simultaneously oxidizing depolarizing agents at the second electrode and forming hydrogen gas and reactivating at the second electrode while simultaneously oxidizing depolarizing agents at the first electrode; wherein the first electrode and the second electrode occur in two separated compartments.

* * * * *